United States Patent Office 2,874,969
Patented Feb. 24, 1959

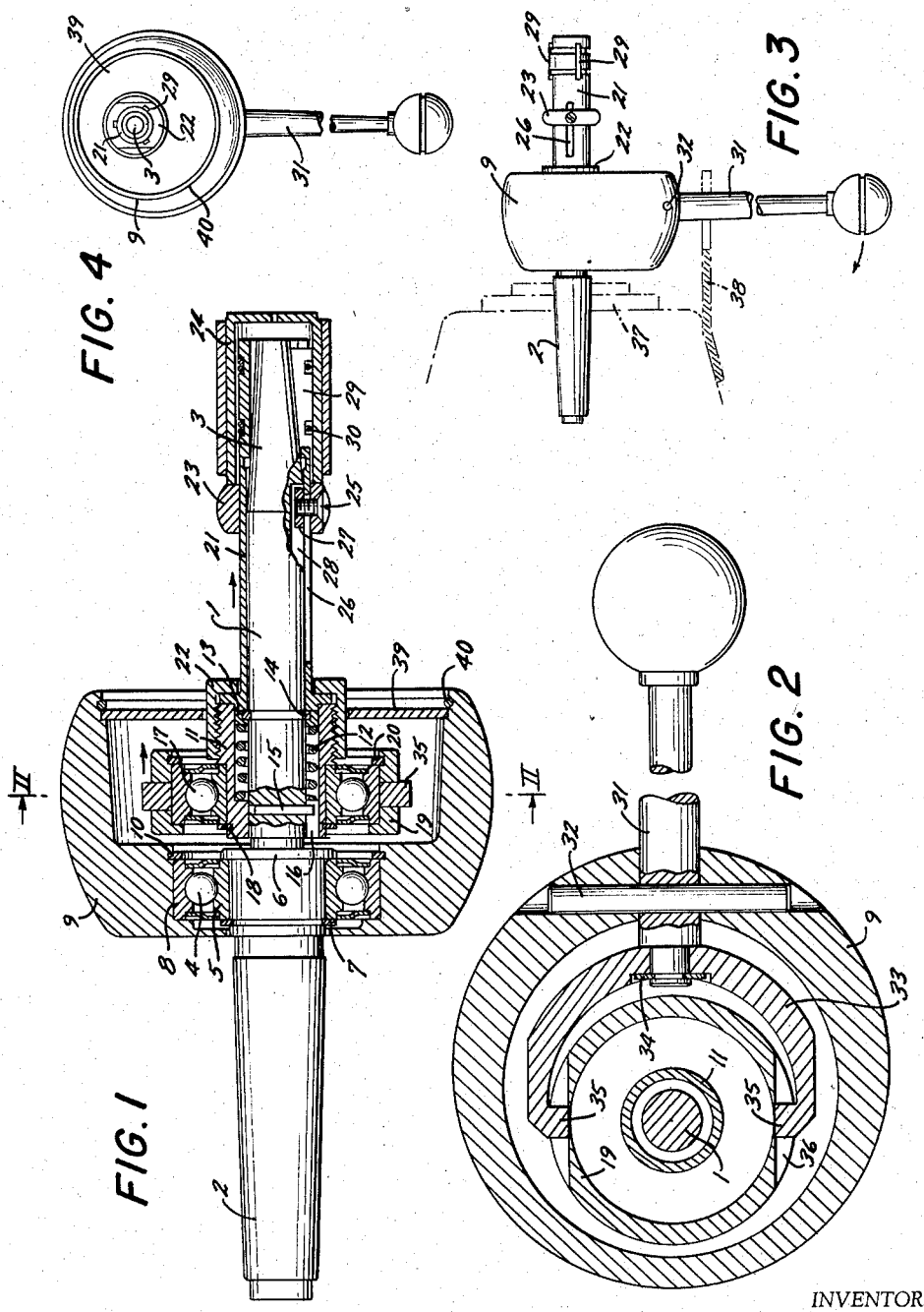

2,874,969

EXPANDING WORK SUPPORT FOR MACHINE TOOLS

Walter Sommer, Leonberg, Germany, assignor to SKF Kugellagerfabriken G. m. b. H., Schweinfurt, Germany Application June 25, 1956, Serial No. 593,481

Claims priority, application Germany June 24, 1955

10 Claims. (Cl. 279—2)

The present invention relates to a device for supporting a workpiece on a machine tool.

More particularly, the present invention relates to a device adapted to be attached to a machine tool for supporting a workpiece thereon. For example, the present invention relates to that type of device which is connected to a machine tool for mounting thereon the shell of a top roll of a textile drafting mechanism when it is necessary to machine the exterior of such a shell as by grinding the same.

Although devices are known for mounting such workpieces on machine tools, the known devices are not very satisfactory for various reasons. Thus, with the known devices the workpiece which is to be machined is not always accurately centered, and furthermore the mounting of the workpiece on the machine tool and the removal thereof from the machine tool is very time consuming and requires the machine tool to be stopped and started.

One of the objects of the present invention is to provide a device for supporting a workpiece on a machine tool in such a way that the workpiece is accurately centered without any special precautions being taken by the operator for this purpose.

Another object of the present invention is to provide a device for mounting a workpiece on a machine tool which enables the workpiece to be mounted on and removed from the machine tool without stopping the operation of the latter.

A further object of the present invention is to provide a device of the above type which is capable of being adapted for use with workpieces of widely varying sizes.

An additional object of the present invention is to provide a device of the above type which is capable of automatically connecting a workpiece to the machine tool in a manner which guarantees that the workpiece will be rotated about its axis to be machined by a cutting tool such as a grinding wheel, for example.

With the above objects in view, the present invention mainly consists of a device for mounting a workpiece on a machine tool, this device including an elongated bar which is adapted to rotate about its axis and which carries an elongated sleeve which is slidable on the bar and constrained to rotate therewith. A connecting means engages the sleeve and bar for connecting a workpiece to the sleeve and bar for rotation therewith when the sleeve is shifted in one direction on the bar and for releasing a workpiece for removal from the sleeve and bar when the sleeve is shifted in an opposite direction on the bar. A manually operable means is operatively connected to the sleeve for shifting the sleeve on the bar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevational view of a device according to the present invention;

Fig. 2 is a transverse sectional view taken along line 2—2 of Fig. 1 in the direction of the arrows;

Fig. 3 is a side elevational view on a reduced scale of the device of Figs. 1 and 2 as it is operatively connected to a machine tool; and Fig. 4 is a front view of the device of Fig. 3 as seen from the right hand side thereof.

Referring now to the drawings and to Fig. 1 in particular, it will be seen that the device of the invention includes an elongated bar 1 which is adapted to rotate about its axis. This bar 1 is provided at its left end portion, as viewed in Fig. 1, with a tapered part 2 adapted to fit into a correspondingly tapered bore of a drive spindle of a machine tool such as a grinding machine, and the bar 1 has an elongated free end portion extending from a housing 9, referred to below, in a direction opposite from the end portion 2 and terminating in a frustoconical end portion 3. A bearing 4 is connected to the bar 1, and the inner race of the bearing 4, which is designated by reference character 5, bears at its right edge, as viewed in Fig. 1, against a shoulder 6 of the bar 1, and a snap ring 7 in a groove of the bar 1 bears against the left edge of the inner race 5 of the bearing 4 so as to retain the latter in a fixed axial position on the bar 1. The outer race 8 of the bearing 4 is fixedly joined to a housing 9, the latter being formed with a groove in which a snap ring 10 is located, and this snap ring 10 engages the right edge of the outer race 8 so as to secure the housing 9 in a given axial position on the bearing 4.

A threaded sleeve section 11 is slidable on the bar 1 just to the right of the shoulder 6 thereof. This threaded sleeve 11 houses in its interior a coil spring 12 which is coiled about the bar 1 and bears with its left end against a shoulder formed on the sleeve section 11. With its right end, the coil spring 12 bears against a ring 13 within the sleeve section 11, and the ring 13 is maintained in a given axial position on the bar 1 by a snap ring 14 located in a groove of the bar 1 and bearing against a shoulder of the ring 13. Thus, the spring 12 urges the sleeve section 11 to the left, as viewed in Fig. 1.

A pin 15 is fixed in a bore of the bar 1 and has a free end portion extending into an axial groove 16 formed in the interior of the sleeve section 11, so that in this way the sleeve section 11 is constrained to turn with the bar 1 while being axially shiftable along the latter.

A bearing 17 is connected to the sleeve 11 and bears against a shoulder thereof, as is evident from Fig. 1, a snap ring 18 being located in a groove of the sleeve section 11 to retain the bearing 17 in a given axial position on the sleeve section 11. The outer race of the bearing 17 is fixed to the interior of a ring 19 formed with an inner groove in which a snap ring 20 is located to prevent axial shifting of the ring 19 with respect to the bearing 17. As is evident from Fig. 2, the ring 19 is formed with a pair of opposed transverse grooves 36 for a purpose described below.

The sleeve section 11 is releasably connected to a sleeve section 21 which rotates with the sleeve section 11. The elongated sleeve section 21 forms with the sleeve section 11 a sleeve constrained to rotate with the bar 1 but being axially shiftable with respect to the latter. As is apparent from Fig. 1, the sleeve section 21 has an outwardly extending annular flange at its left end, as viewed in Fig. 1, and this flange is located within a nut 22 threadedly engaging the outer threaded surface of the threaded sleeve section 11 and having an inwardly directed annular flange located to the right of the flange of the sleeve section 21, so that when the nut 22 is tightened onto the sleeve section 11, the sleeve section 21 is fixed to the sleeve section 11 for rotation therewith, and in order to remove the sleeve section 21 it is only necessary to unscrew the nut 22.

A stop ring 23 is located at the exterior of the sleeve section 21. As is apparent from Fig. 1, the shell 24 of a top roll of a drafting mechanism, for example, is located on the sleeve 21 with the left edge of the shell 24 engaging the stop ring 23, so that this stop ring determines the axial position of the shell 24 on the machine tool.

The ring 23 is capable of being shifted to a desired axial position along the sleeve section 21 and of being fixed in this axial position. Thus, the ring 23 carries a screw 25 which extends through an elongated slot 26 formed in the sleeve section 21, and the screw 25 is threadedly connected to a nut member 27 which is slidable within an axial groove 28 formed in the bar 1. The nut 27 cannot turn in the axial groove 28 and can only slide along the latter, so that the screw 25 can be loosened whenever desired, and the ring 23 can be shifted to a desired axial position on the sleeve section 21, after which the screw 25 is tightened in order to fix the ring 23 in the desired position on the sleeve section 21. Thus, in accordance with the axial length of a workpiece such as the shell 24, the ring 23 is located in a desired position on the sleeve section 21.

The right free end portion of the sleeve section 21 which is located about the frustoconical portion 3 of the bar 1 is formed with three elongated slots extending axially of the sleeve 21 and distributed about the axis thereof at 120° from each other. Three wedge members 29 are located in these slots and are freely movable in a radial direction toward and away from the axis of the sleeve 21, the wedge members 29 engaging the frustoconical portion 3 of the bar 1 and having outer axial edges which are parallel to the axis of the bar 1, as is apparent from Fig. 1. The wedge members 29 are formed with notches communicating with their outer faces, and these notches are aligned with annular grooves formed in the exterior of the sleeve 21. Annular springs 30 are located in these grooves and in the notches of the wedge members 29 to continually urge the latter inwardly toward the axis of the sleeve 21, so that in this way the wedges 29 remain constantly in engagement with the frustoconical portion 3 of the bar 1.

A manually operable means is provided for manually shifting the sleeve 11, 21 against the force of the spring 12, and this manually operable means is shown in detail in Fig. 2. As may be seen from Fig. 2, a lever 31 is pivotally carried by the housing 9 through the medium of a pivot pin 32 fixed in a bore of the housing 9 and extending through a bore of the lever 31, the housing 9 being provided with a cutout which gives the desired extent of turning movement of the lever 31 about the axis of the pivot pin 32. A substantially U-shaped member 33 is fixed to the lever 31 for turning movement therewith about the pivot pin 32, and a snap ring 34 located in an annular groove of the left free end of the lever 31, as viewd in Fig. 2, secures the U-shaped member 33 to the lever 31 for turning movement therewith. This U-shaped member 33 terminates in a pair of inwardly extending projections 35 of circular cross section which extend into the grooves 36 of the ring 19 and which extend radially toward the axis of the bar 1, so that when the lever 31 is turned the projections 35 will cause the ring 19 to shift axially along the bar 1.

The above described structure is shown in a front view in Fig. 4 on a reduced scale. As may be seen from Fig. 4 as well as Fig. 1, the housing 9 carries a protective plate 39 formed with an opening through which the nut 22 freely passes with a small clearance, and this plate 39 prevents dirt or the like from entering into the interior of the housing 9. A snap ring 40 is located in a groove of the housing 9 in engagement with the protective plate 39 to retain the latter on the housing 9.

The device is shown on a reduced scale in Fig. 3 mounted on a machine tool. The tapered free end portion 2 of the bar 1 is in driving engagement with a spindle 37 of the machine tool, and the machine tool carries a guide 38 formed with an elongated notch through which the lever 31 passes, this guide 38 constraining the lever 31 to turn to the left and right, as viewed in Fig. 3, but preventing the housing 9 from rotating about the axis of the bar 1.

The above described structure operates as follows: The device of Figs. 1 and 2 is mounted on a machine tool in the manner shown in Fig. 3 with the lever 31 extending downwardly through the notch of the guide 38 which is fixed to the spindle housing of the machine tool. As is apparent from Fig. 1, when the bar 1 rotates about its axis, the pin 15 forces the sleeve section 11 to rotate with the bar 1, and because the sleeve section 21 is fixed to the sleeve section 11, the sleeve section 21 also rotates with the sleeve section 11. Thus, the inner race of the bearing 17 also turns with the bar 1, and the same is true of the nut 22. Also, it will be noted that the stop ring 23 as well as the wedge members 29 all rotate with the bar 1.

When it is desired to place a workpiece, such as the shell 24, on the device in order to be rotated about its axis, it is not necessary to stop the rotation of the bar 1. It is only necessary to turn the lever 31 in a clockwise direction, as shown by the arrow at the bottom of Fig. 3. Such turning of the lever 31 will cause the U-shaped member 33 to shift forwardly, and as a result the ring 19 together with the bearing 17 and the sleeve 11, 21 will shift to the right, as viewed in Fig. 1. When the wedge members 29 shift to the right, the springs 30 urge them inwardly toward the axis of the sleeve 21, and in this position it is possible for the sleeve 24 to be very quickly and easily slipped over the wedge members 29 into engagement with the stop ring 23. Then the operator merely releases the lever 31. Upon release of the lever 31, the spring 12 shifts the sleeve 11, 21 with all of the parts connected thereto to the left, as viewed in Fig. 1, and this movement causes the wedge members 29 to move outwardly of the axis of the sleeve 21 into pressing engagement with the inner face of the shell 24 so as to tightly connect the latter to the sleeve 21 for rotation therewith, and in this simple and quick manner the workpiece is operatively connected to the machine tool to be rotated thereby without stopping the operation of the machine tool. When it is desired to release the workpiece 24 from the machine tool, it is only necessary to again turn the lever 31 in a clockwise direction, as viewed in Fig. 3, and this will again result in shifting of the sleeve 11, 21 to the right, as shown by the arrow in Fig. 1, and in this way the springs 30 will again move the wedge members 29 inwardly into the interior of the sleeve section 21, so that the workpiece 24 can be very quickly removed and replaced by another workpiece.

In the event that it is desired to work with workpieces of different dimensions, it is only necessary to unscrew the nut 22 and to replace the sleeve section 21 with another sleeve section of suitable dimensions for workpieces of a different dimension.

It will be understood that each of the elements described above, or two or more together, may also find a useful application in other types of devices for supporting workpieces on a machine tool differing from the types described above.

While the invention has been illustrated and described as embodied in devices for removably supporting workpieces on a machine tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A work supporting attachment for a machine tool, comprising, in combination, an elongated bar adapted to rotate about its axis and having a free end portion adapted to be releasbly connected with the drive spindle of a machine tool; a sleeve through which said bar extends, said sleeve being shiftable axially along said bar and being constrained to rotate therewith; manually operable shifting means operatively connected to said sleeve for shifting the same on said bar; connecting means engaging said sleeve and bar for releasably connecting a workpiece to said sleeve and bar, said connecting means being actuated by the shifting of said sleeve in one direction along said bar to release a workpiece and by the shifting of said sleeve in an opposite direction along said bar for connecting a workpiece to said sleeve and bar for rotation therewith; and support means carried by said bar and supporting said shifting means.

2. A machine tool attachment for supporting a workpiece on a machine tool comprising, in combination, an elongated bar adapted to rotate about its axis and having an elongated free end portion and an opposite end portion adapted to be releasably connected with a drive spindle of a machine tool; an elongated sleeve into which said free end portion of said bar extends, said sleeve being shiftable axially along said bar and being constrained to rotate therewith; lever means operatively connected to said sleeve for shifting the same on said bar; connecting means engaging said lever and bar for releasing a workpiece when said lever means is actuated to shift said sleeve in one direction on said bar and for connecting a workpiece to said sleeve and bar for rotation therewith when said sleeve shifts in an opposite direction on said bar; and support means carried by said bar for free rotation with respect thereto and supporting said lever means, the latter and said support means remaining stationary while said sleeve, bar and connecting means rotate when said opposite end of said bar is connected with a drive spindle of a machine tool.

3. A device for supporting a workpiece for rotation on a machine tool, comprising, in combination, an elongated bar adapted to rotate about its axis; an elongated sleeve into which said bar extends, said sleeve being shiftable on a free end portion of said bar and being constrained to rotate with the latter and said sleeve being made of two sections which are releasably connected together with one of said sections being located nearer to the free end of said bar than the other, so that said one section of said sleeve may be removed and replaced by a sleeve section of other dimensions to accommodate workpieces of different dimensions; manually operable means for shifting said sleeve along said bar; and connecting means engaging said sleeve and bar for releasing a workpiece when said sleeve is shifted in one direction on said bar and for connecting a workpiece to said sleeve and bar for rotation therewith when said sleeve is shifted in an opposite direction on said bar.

4. A machine tool attachment for supporting a workpiece on a machine tool, comprising, in combination, an elongated bar adapted to rotate about its axis and having a free end portion adapted to be releasably connected with the drive spindle of a machine tool; a sleeve shiftable on said bar; connecting means connected to said sleeve for releasing a workpiece when said sleeve is shifted in one direction on said bar and for connecting a workpiece to said sleeve and bar for rotation therewith when said sleeve is shifted in an opposite direction on said bar; spring means operatively connected to said sleeve for urging the same in said opposite direction; manually operable means engaging said sleeve for shifting the same in said one direction against the force of said spring means; and support means carried by said bar and supporting said manually operable means, said bar being freely rotatable with respect to said support means.

5. A machine tool attachment for mounting a workpiece on a machine tool, comprising, in combination, an elongated bar adapted to rotate about its axis and having a free end portion of frustoconical configuration and an opposite end portion adapted to be releasably connected with a drive spindle of a machine tool; an elongated sleeve shiftable on said bar and constrained to rotate therewith, said sleeve having a portion in which said frustoconical part of said bar is located, and said portion of said sleeve being formed with a plurality of axial slots; a plurality of wedge members located in said slots, engaging said frustoconical portion of said bar, and extending radially out beyond said sleeve, so that when the latter is shifted in one axial direction on said bar said wedge members will move radially out of said sleeve and when the latter is shifted in an opposite direction on said bar said wedge members will shift radially into the interior of said sleeve; spring means operatively connected to said sleeve for shifting the same in said one direction; manually operable means operatively connected to said sleeve for shifting the same in said opposite direction against the force of said spring means; and support means carried by said bar and supporting said manually operable means, said bar being freely rotatable with respect to said support means.

6. A machine tool attachment for supporting a workpiece on a machine tool, comprising, in combination, an elongated bar adapted to rotate about its axis; a housing carrying said bar for rotation about its axis so that said bar is freely rotatable with respect to said housing, said bar having an elongated free end portion extending beyond said housing and an opposite end portion extending in an opposite direction beyond said housing and adapted to be removably connected with a drive spindle of a machine tool; a sleeve slidable on said elongated free end portion of said bar and extending into the interior of said housing; lever means pivotally carried by said housing, having a manually engageable portion extending to the exterior of said housing, and having an inner portion operatively connected to said sleeve for shifting the same axially with respect to said bar, said sleeve being constrained to rotate with said bar; stop means on said sleeve for determining the position of a workpiece thereon; and connecting means engaging said sleeve and bar for connecting a workpiece to said sleeve and bar for rotation therewith when said sleeve is shifted in one direction and for releasing a workpiece from said sleeve and bar when said sleeve is shifted in an opposite direction.

7. A machine tool attachment for supporting a workpiece on a machine tool comprising, in combination, a housing; a bar extending through said housing and being turnably supported for rotation about its axis by said housing, said bar having one end portion extending beyond said housing and adapted to be connected to the spindle of a machine tool and having an opposite end portion extending beyond said housing and terminating in a frustoconical portion; an elongated sleeve slidable on said opposite end portion of said bar and constrained to rotate therewith, said sleeve being formed with a plurality of axial slots located opposite said frustoconical portion of said bar; a plurality of wedge members located in said slots of said sleeve and engaging said frustoconical portion of said bar so that when said sleeve is shifted in one axial direction said wedge members move outwardly of said sleeve and when said sleeve is shifted in an opposite axial direction said wedge members move inwardly into said sleeve; spring means operatively connected to said sleeve for shifting the same in said one direction to urge said wedge members outwardly of said sleeve; and lever means carried by said housing and operatively connected to said sleeve for shifting the same in said opposite direction to release said wedge members for movement into the interior of said sleeve.

8. A machine tool attachment for supporting a workpiece on a machine tool comprising, in combination, a housing; a bar extending through said housing and being turnably supported for rotation about its axis by said housing, said bar having one end portion extending beyond said housing and adapted to be connected to the spindle of a machine tool and having an opposite end portion extending beyond said housing and terminating in a frustoconical portion; an elongated sleeve slidable on said opposite end portion of said bar and constrained to rotate therewith, said sleeve being formed with a plurality of axial slots located opposite said frustoconical portion of said bar; a plurality of wedge members located in said slots of said sleeve and engaging said frustoconical portion of said bar so that when said sleeve is shifted in one axial direction said wedge members move outwardly of said sleeve and when said sleeve is shifted in an opposite axial direction said wedge members move inwardly into said sleeve; spring means operatively connected to said sleeve for shifting the same in said one direction to urge said wedge members outwardly of said sleeve; and lever means carried by said housing and operatively connected to said sleeve for shifting the same in said opposite direction to release said wedge members for movement into the interior of said sleeve, said sleeve being made of a pair of removably interconnected sections one of which is located at the exterior of said housing on said opposite end portion of said bar, so that said one section may be removed and replaced for another sleeve section of different dimensions.

9. A machine tool attachment for supporting a workpiece on a machine tool comprising, in combination, a housing; an elongated bar extending through said housing and carried for rotation about its axis by said housing, said bar having an elongated free end portion extending beyond said housing and an opposite end portion extending in an opposite direction beyond said housing and adapted to be removably connected with a drive spindle of a machine tool; an elongated sleeve shiftable on said elongated free end portion of said bar and constrained to rotate therewith; a bearing carried by said sleeve in said housing; lever means carried by said housing and connected by said bearing to said sleeve for shifting the latter along said bar; and gripping means engaging said sleeve and bar for gripping a workpiece when said sleeve is shifted in one direction and for releasing a workpiece when said sleeve is shifted in an opposite direction.

10. A machine tool attachment for supporting a workpiece on a machine tool, comprising, in combination, an elongated bar adapted to rotate about its axis; a housing carrying said bar for rotation about its axis so that said bar is freely rotatable with respect to said housing, said bar having an elongated free end portion extending beyond said housing and an opposite end portion extending in an opposite direction beyond said housing and adapted to be removably connected with a drive spindle of a machine tool; a sleeve slidable on said elongated free end portion of said bar and extending into the interior of said housing; lever means pivotally carried by said housing, having a manually engageable portion extending to the exterior of said housing, and having an inner portion operatively connected to said sleeve for shifting the same axially with respect to said bar, said sleeve being constrained to rotate with said bar; and connecting means engaging said sleeve and bar for connecting a workpiece to said sleeve and bar for rotation therewith when said sleeve is shifted in one direction and for releasing a workpiece from said sleeve and bar when said sleeve is shifted in an opposite direction.

References Cited in the file of this patent

UNITED STATES PATENTS

| 2,213,379 | Bird et al. | Sept. 3, 1940 |
| 2,399,831 | Schmidt | May 7, 1946 |
| 2,564,827 | Youtz | Aug. 21, 1951 |
| 2,698,551 | Olsen | Jan. 4, 1955 |

FOREIGN PATENTS

| 113,110 | Germany | Aug. 30, 1900 |
| 398,390 | France | June 3, 1909 |
| 74,545 | Switzerland | August 1917 |
| 469,302 | Great Britain | July 22, 1937 |